United States Patent [19]

Munini

[11] Patent Number: 4,796,856

[45] Date of Patent: Jan. 10, 1989

[54] WATERTIGHT JOINT FOR FLEXIBLE PIPES

[75] Inventor: Dino Munini, S. Quirino, Italy

[73] Assignee: Protec Pordenonese S.p.A., S. Quirino, Italy

[21] Appl. No.: 96,630

[22] Filed: Sep. 11, 1987

Related U.S. Application Data

[63] Continuation-in-part of Ser. No. 922,081, Oct. 21, 1986, abandoned.

[30] Foreign Application Priority Data

Oct. 22, 1985 [IT] Italy .................. 83429 A/85

[51] Int. Cl.$^4$ ............................................ F16L 37/28
[52] U.S. Cl. ................................ 251/149.5; 285/315; 285/321
[58] Field of Search ................ 285/243, 315, 321; 251/149.1, 149.5

[56] References Cited

U.S. PATENT DOCUMENTS 3,847,393 11/1974 Busselmeier ................. 285/315
3,918,679 11/1975 Silvana ........................ 251/149.1
4,219,222 8/1980 Brusadin ...................... 285/8

Primary Examiner—A. Michael Chambers
Attorney, Agent, or Firm—Workman, Nydegger & Jensen

[57] ABSTRACT

The present invention is directed to a removably coupling watertight joint. The joint consists of a male piece which is inserted within a female piece. Both the male and female pieces may be attached to flexible pipes or to other fluid flow devices. Integrally molded onto the female piece are two flexible clasping tongues which deflect inward to engage the male piece.

Also integrally molded onto the female piece are means for biasing a joint coupling bushing in a locked position. The joint coupling bushing surrounds the female piece and has internal projections which cause the elastic clasping tonques to deflect inward and engage the male piece. In its locked position, the joint coupling bushing deflects the flexible clasping tongues inward thereby engaging the male piece.

By sliding the joint coupling against the biasing means, the internal projections no longer deflect the elastic clasping tongues inward sufficient to engage the male piece, thereby permitting uncoupling of the male piece from the female piece.

18 Claims, 3 Drawing Sheets

WATERTIGHT JOINT FOR FLEXIBLE PIPES

RELATED APPLICATION

This application is a continuation-in-part application of copending application Ser. No. 06/922,081, filed Oct. 21, 1986, now abandoned, in the name of the inventor hereof, and entitled "Watertight Joint for Flexible Pipes."

BACKGROUND

1. The Field of the Invention

The invention relates to an improved watertight joint for flexible pipes. More particularly, the present invention permits rapid coupling and uncoupling of a flexible pipe to another flexible pipe or to a fluid flow device.

2. The Prior Art

Flexible pipes, such as garden hoses, are used in virtually every household. The inherent flexibility of garden hoses gives them a versatility of use unsurpassed by other watering devices. Their versatility may also be attributed to the ability to couple and uncouple a single garden hose to many different water sources, watering devices, or additional garden hoses.

Perhaps the most common method of joining flexible pipes such as garden hoses is through the well-known screw-thread joint. In this joint, the male and female elements have tapered ends which fit in the open ends of flexible pipes. Clamping devices are then used to tighten the pipes around the tapered ends.

Although the screw thread joint is common, it is inconvenient and time consuming to use. Quite often the threads become damaged making it difficult to manually screw one pipe end to another. This problem is compounded if dirt gets into the threads. Furthermore, a washer forms the watertight seal which will crack and stiffen when exposed to heat and the passage of time. As a result, the joint often leaks.

Another known method of joining two flexible pipes is by using a tubular intermediate connecting piece having two opposite tapered ends. The narrowest ends are fitted into the flexible pipes. Clamping devices are used to clamp the flexible pipes around the tapered ends. This method of joining flexible pipes is often neither practical nor functional. Complex operations are necessary to connect and disconnect the pipes which eventually lead to pipe or joint failure.

Yet another device for joining flexible pipes consists of a female fitting piece which is connected to one pipe end and a male fitting piece which is connected to the other pipe end. The two pieces are coupled by inserting the male piece into the female piece. This method of joining flexible pipes permits rapid coupling and uncoupling of the pipe joint.

Much of the recent development in the art of joining flexible pipes has focused on the method of securely holding the male piece within the female piece, yet being able to release the male piece on demand.

One approach to this problem has been to use an actuating ring surrounding the female element which slides longitudinally. Sliding the actuating ring causes arresting noses to pivot and engage or disengage the male element. This device, as well as many other similar devices, is complex structurally and requires small internal component parts.

Such complex structures complicates manufacturing processes, makes assembly difficult, and reduces reliability even under normal operating conditions. Furthermore, if these complex devices are used on flexible pipes which contact soil or dirt, the dirt may readily plug the recesses inside the joint where the locking and control elements shift and operate, thereby impairing the proper function of the devices.

Another known joint for flexible pipes consists of a female piece, a male piece, and a control ring surrounding the female piece which is longitudinally slidable in relation to the female piece. Integrally molded with the control ring are a plurality of flexible tangs which extend inward through a series of holes in the female piece and lock the male piece within the female piece. Also integrally molded with the control ring are elastic members which bias the control ring in a position where the male piece is locked within the female piece.

Even though this joint design requires fewer component parts, the parts used are structurally very complex. Manufacturing the device, therefore, can be complicated and costly. Furthermore, having the flexible tangs integrally molded to the control ring does not sufficiently "lock" the male piece. High fluid pressure or a firm pull on the male piece can easily cause the flexible tangs to extend outward and disengage the male piece. Thus, the device is not very reliable.

From the foregoing, it will be appreciated that what is needed in the art is an improved watertight joint for removably coupling flexible pipes which does not require small complex component parts, but which has all of the necessary parts integrally molded to the main body of the joint.

Additionally, it would be a significant advancement in the art to provide an improved watertight joint for removably coupling flexible pipes which may be manufactured at relatively low cost and may be easily assembled and disassembled.

It would be another advancement in the art to provide an improved watertight joint for removably coupling flexible pipes which is highly reliable and quickly connectable in that no screwing is necessary in order to achieve watertightness.

It would be yet another advancement in the art to provide an improved watertight joint for removably coupling flexible pipes which is not easily spoiled or clogged by soil or dirt.

The foregoing, and other features and objects of the present invention, are realized in the improved watertight joint for removably coupling flexible pipes which is disclosed and claimed herein.

BRIEF SUMMARY AND OBJECTS OF THE INVENTION

The present invention is directed to a watertight joint for removably coupling flexible pipes or devices to flexible pipes. The joint consists of a male piece which is inserted within a female piece. Both the male and female pieces may be attached to flexible pipes or to another fluid flow device such as a fluid source or spray nozzle. Integrally molded onto the female piece are two flexible clasping tongues which deflect inward to engage the male piece.

Also integrally molded onto the female piece are means for biasing a joint coupling bushing in a lock position. The joint coupling bushing surrounds the female piece and has internal projections which cause the elastic clasping tongues to deflect inward and engage the male piece. In its lock position, the joint coupling bushing deflects the flexible clasping tongues inward thereby engaging the male piece.

By sliding the joint coupling bushing against the biasing means the internal projections no longer deflect the elastic clasping tongues inward sufficient to engage the male piece, thereby permitting uncoupling of the male piece from the female piece.

It is, therefore, an object of the present invention to provide an improved watertight joint for removably coupling flexible pipes which does not require small complex component parts, but has all of the necessary parts integrally molded into the main body of the joint.

Another important object of the present invention is to provide an improved watertight joint for removably coupling flexible pipes which may be manufactured at very low cost and may be easily assembled or disassembled.

An additional important object of the present invention is to provide an improved watertight joint for removably coupling flexible pipes which is highly reliable and quickly connectable in that no screwing is necessary in order to achieve watertightness.

Still another object of the present invention is to provide an improved watertight joint for removably coupling flexible pipes which is not easily spoiled or clogged by soil or dirt.

These and other objects and features of the present invention will become more fully apparent from the following description and appended claims taken in conjunction with the accompanying drawings.

DETAILED DESCRIPTION OF THE PREFERRED EMBODIMENTS

Figure 1:
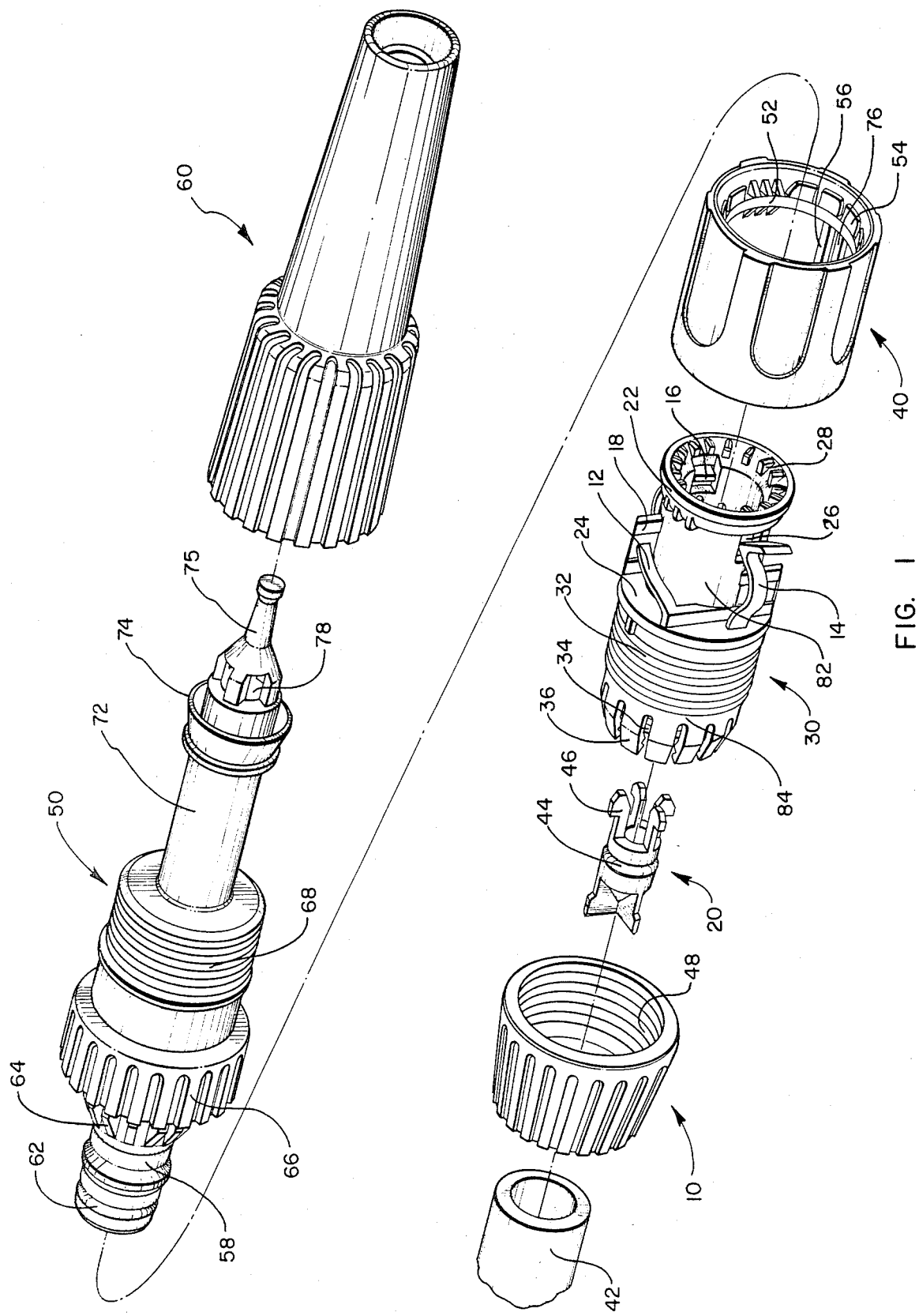
FIG. 1 is an exploded perspective view of a presently preferred embodiment of the present invention.

Reference is now made to the drawings wherein like parts are designated with like numerals throughout. referring first to FIG. 1, one presently preferred embodiment of the present invention is illustrated in an exploded format.

The female element, generally designated 30, is designed to receive a male element 50 at one end and a flexible pipe 42 at the other end. A shoulder 24 divides the female element into a mating portion 82 and a pipe coupling portion 84. Mating portion 82 defines part of a fluid passageway through the center of female element 30.

A male element, generally designated 50, is designed to be inserted within the mating portion 82 of female element 30. Male element 50 has a toroidal gasket 62 for providing an external watertight seal. There is a fluid passageway through the center of male element 50. An engaging notch 58 is located on that portion of male element 50 such that it can be inserted within mating portion 82 of female element 30.

Female element 30 further contains two flexible clasping tongues 14 which are integrally molded with shoulder 24 and are capable of extending through two openings 26 within the mating portion 82. Flexible clasping tongues 14 each have an inwardly projecting tooth capable of engaging the engaging notch 58 of male element 50 to keep the male element in place within mating portion 82. Also, integrally molded to shoulder 24 are two leaf springs 12 and two fins 18.

The pipe coupling portion 84 of female element 30 has external threads 32 adjacent to shoulder 24. A pipe clamping toothed crown composed of a plurality of flexible teeth 36 is located at the end of female element 30 adjacent to external threads 32. Each flexible tooth 36 extends inwardly toward a jointing tube 34 which forms part of the fluid passageway through female element 30. Jointing tube 34 is configured such that flexible pipe 42 can be placed around the tube. Preferably, jointing tube 34 is externally tapered to facilitate positioning the flexible pipe 42 around jointing tube 34.

Figure 6:
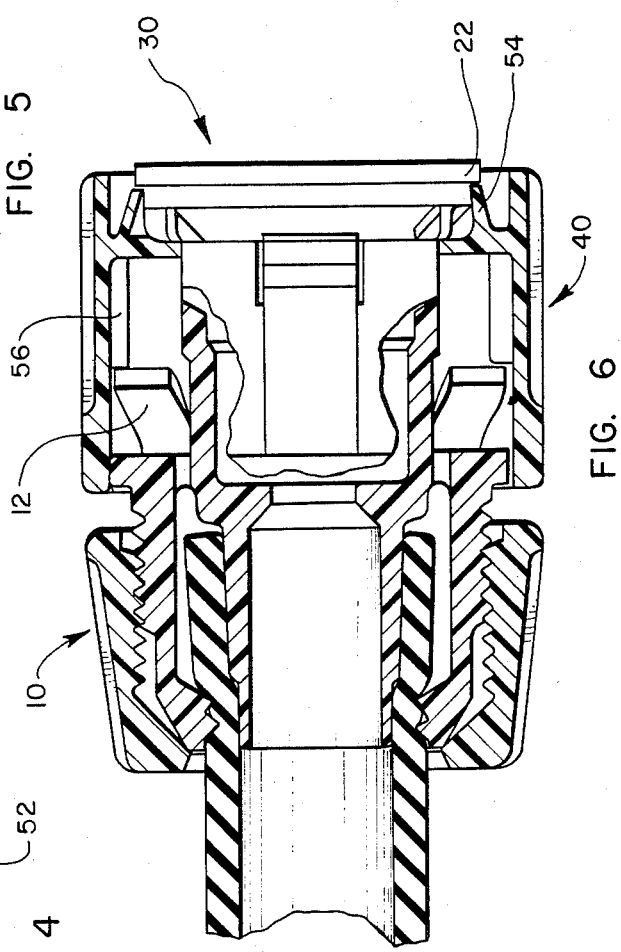
FIG. 6 is a cross-sectional view of the female element of the present invention illustrated in FIG. 2 taken along line 6—6 of FIG. 2.

A pipe coupling ring, generally designated 10, is designed to be screwed over the pipe coupling portion 84 of female element 30. Pipe coupling ring nut 10 contains internal threads 48 which correspond to external threads 32 of pipe coupling portion 84. Pipe coupling ring nut 10 screws on the external threads 32 and pushes the flexible teeth 36 against flexible pipe 42 thereby compressing the flexible pipe against female element 30 so as to retain the flexible pipe within the female element. The interrelationship of these parts is more fully illustrated in FIGS. 3 and 6.

Even though the illustrated embodiment of the present invention shows means for coupling a flexible pipe to the female element, it will be appreciated that the female element may be configured to contain means for coupling other tubular devices to the female element. For example, the female element may contain means for coupling it to a fluid source, to spray devices, or to non-flexible pipes.

Although the pipe clamping toothed crown is illustrated by a plurality of flexible teeth 36, it will be appreciated that flexible pipe 42 may be securely held in place by a single "flexible tooth" configuration. For example, the "flexible tooth" may be arranged in a nearly complete circle around jointing tube 34. When pipe coupling ring nut 10 is screwed onto external threads 32 the flexible tooth is pushed inward toward jointing tube 34 and the gap in the circular configuration of the flexible tooth is closed so that the flexible tooth forms a circle around jointing tube 34 and flexible pipe 42.

Figure 3:
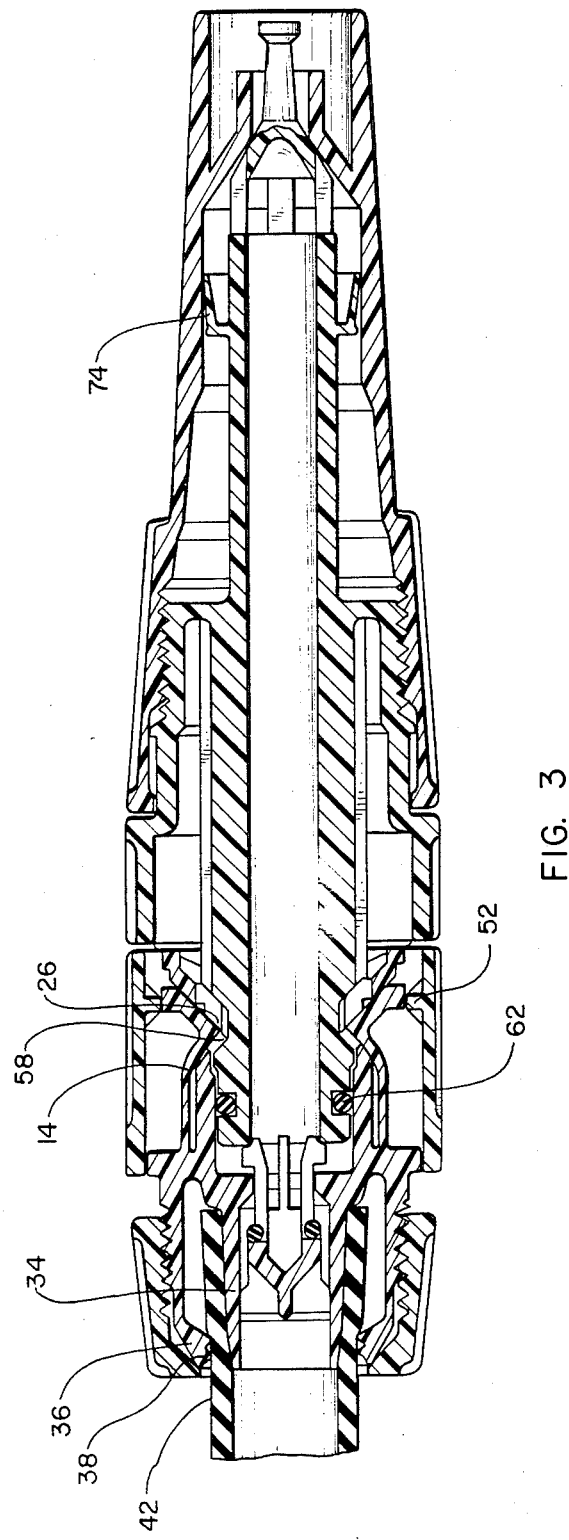
FIG. 3 is a cross-sectional view of FIG. 2 taken along line 3—3 of FIG. 2.
Figure 5:
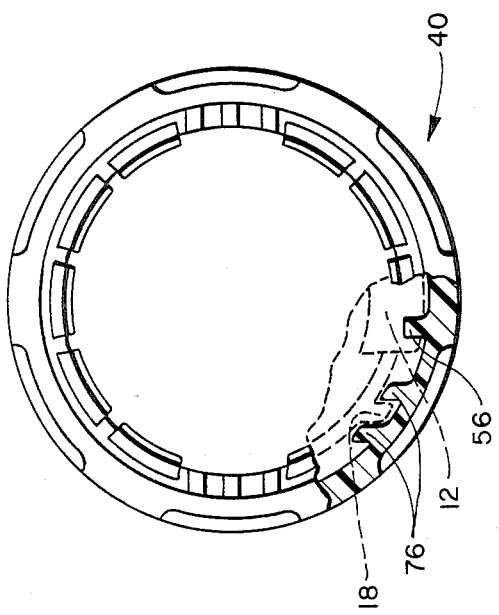
FIG. 5 is an end view with partial break-away of the joint coupling bushing illustrated in FIG. 4.
Figure 4:
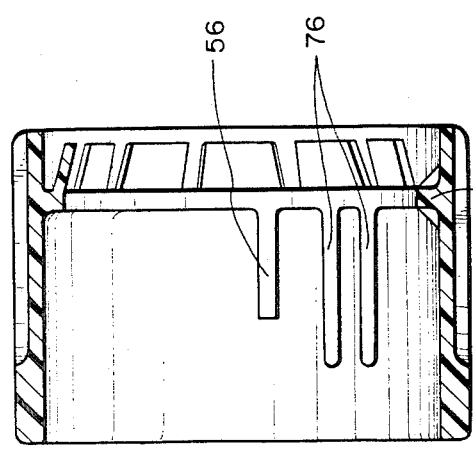
FIG. 4 is a cross-sectional view of the joint coupling bushing of FIG. 1 taken along line 4—4 of FIG. 1.

A joint coupling bushing, generally designated 40, is designed to be positioned around the mating portion 82 of female element 30. As best illustrated in FIG. 3, joint coupling bushing 40 contains internal projections 52 which cause flexible clasping tongues 14 to deflect inwardly and engage engaging notch 58 with the inwardly projecting teeth 16.

Even though the illustrated embodiment of the present invention shows two flexible clasping tongues 14, it will be appreciated that the present invention would function with only one clasping tongue or more than two clasping tongues. If it is desired to include more than two clasping tongues then it is highly preferable that the clasping tongues are arranged symmetrically around mating portion 82. It should be noted that the number of openings 26 within mating portion 82 as well as the number of internal projections 52 inside joint coupling bushing 40, should be the same as the number of flexible clasping tongues 14.

Leaf springs 12 of female element 30 bias the joint coupling bushing 40 in a position such that flexible clasping tongues 14 are deflected inwardly. Spring stops 56 are located on the inner surface of joint coupling bushing 40 and engage leaf springs 12. Guide ribs 76 are also located on the inner surface of the joint coupling bushing and are designed to receive fins 18 of female element 30. Guide ribs 76 of joint coupling bushing 40 and fins 18 of female element 30 together prevent the joint coupling bushing from rotating around the female element.

Fastening springs 54 are located on the inner surface of joint coupling bushing 40 and engage abutting end 22 of female element 30. During the manufacturing process, the joint coupling bushing 40 is slid over abutting end 22 to surround mating portion 82. In order to pass over abutting end 22, fastening springs 54 must deflect outwardly. Once the fastening springs have passed abutting end 22, they spring back to their original position to prevent joint coupling bushing 40 from sliding off female element 30.

Referring now to FIG. 1, abutting end 22 has a plurality of inwardly projecting teeth 28 which mesh with guides 64 of male element 50 when the male element is inserted within the female element. The inwardly projecting teeth 28 and guides 64 prevent male element 50 from rotating within mating portion 82.

Figure 2:
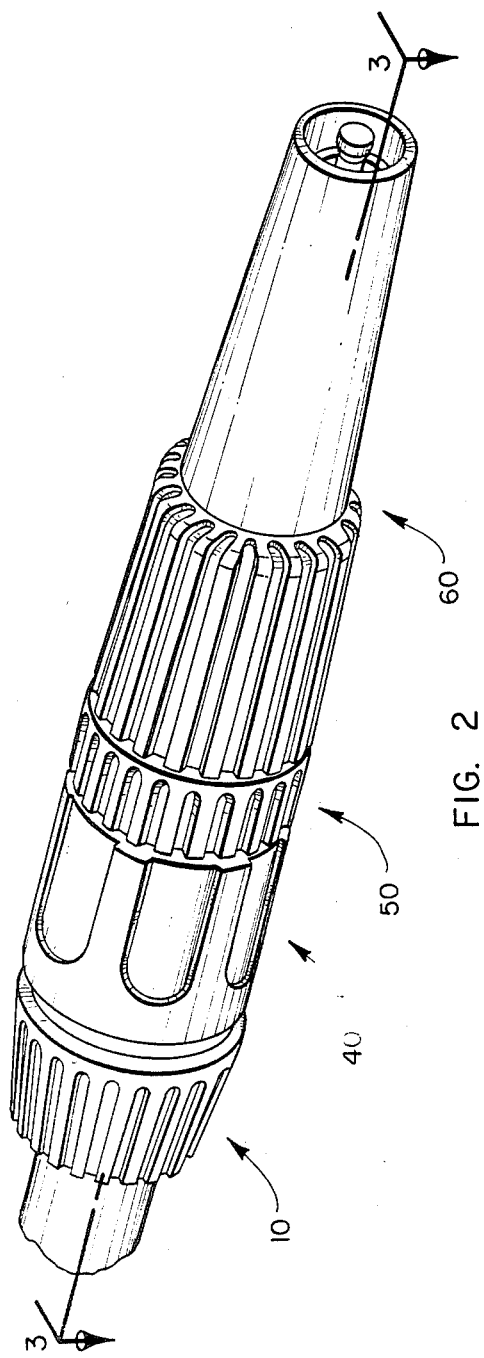
FIG. 2 is an assembled perspective view of a presently preferred embodiment of the present invention.

In FIGS. 1, 2, and 3, male element 50 is illustrated in the form of a spray nozzle. It will be appreciated that the male element may take the form of other fluid flow devices such as sprayers, sprinklers, or even the fluid source.

In addition, the male element may also be attached to a flexible pipe in essentially the same way female element 30 is attached to a flexible pipe with a joint coupling portion 84 and pipe coupling ring nut 10. In such a configuration, two flexible pipes could be quickly and securely coupled or uncoupled as desired.

The spray nozzle configuration of the male element is similar to other spray nozzles known in the art. For example, there is a nozzle body 72, a nozzle tip 75, and threads 68 to which an output adjusting bushing 60 may be threadably attached. A tightening ring nut 66 is located on the male element which may be held so that the output adjusting bushing 60 may be screwed in or out to adjust fluid flow.

Integrally molded to the nozzle body is a cup-shaped gasket 74 which prevents fluid from entering a space between the nozzle body and the output adjusting bushing. This is accomplished due to the high fluid pressure on the inner surface of the cup-shaped gasket 74 which causes the gasket to flex outwardly and to come in contact with the inner surface of output adjusting bushing 60. As the fluid pressure increases, the cup-shaped gasket flexes against the output adjusting bushing with even more force making the seal even more effective.

It will be appreciated that toroidal gasket 62 of male element 50 can be replaced by a similar cup-shaped gasket to provide an external watertight seal.

A comeback preventer valve, generally designated 20 in FIG. 1, may be inserted within jointing tube 34 of female element 30. Comeback preventer valve 20 contains engaging feet 46 and a toroidal gasket 44. While comeback preventer valve is being inserted within jointing tube 34, engaging feet 46 are caused to deflect inwardly by inner shoulder 86 of female element 30.

Inner shoulder 86 defines a narrow fluid passageway separating the jointing tube 34 from the mating portion 82. After the engaging feet 46 have passed inner shoulder 86, they spring back to their normal position and engage inner shoulder 86, thereby preventing comeback preventer valve 20 from falling out of jointing tube 34.

When the male element is inserted within mating portion 82, the male element prevents the comeback preventer valve from blocking the fluid passageway. When the male element is removed from the mating portion 82, fluid pressure causes comeback preventor valve 20 to slide inward towards mating portion 82 and block the fluid passageway, and the toroidal gasket 44 comes in contact with inner shoulder 86 to seal the passageway and prevent fluid from escaping. Thus, comeback preventer valve 20 permits fluid to flow through the female element only if the male element is properly coupled with the female element.

The present invention is easily operated. It may be quickly attached to a flexible pipe by simply sliding one end of a flexible pipe over jointing tube 34 and screwing pipe coupling ring nut 10 onto external threads 32.

Male element 50 is quickly inserted within mating portion 82 by grasping the joint coupling bushing 40 and sliding it longitudinally toward the pipe coupling portion of female element 30 and then allowing joint coupling bushing 40 to spring back to its locked position after the male element has been inserted within mating portion 82. The present invention may be quickly uncoupled by grasping joint coupling bushing 40 and sliding it towards pipe coupling portion 84, removing male element 50 from mating portion 82, and releasing joint coupling bushing 40 so that it may spring back to its locked position.

Although much of the discussion has focused on the use of the present invention in a domestic application, it will be appreciated that the present invention may be used to join flexible pipes for use in industrial, commercial, and scientific applications.

From the foregoing, it will be appreciated that the present invention provides an improved water tight joint for flexible joints which has all flexible and intricate parts integrally molded into the main body of the joint. The present invention may, therefore, be manufactured at very low cost and may be easily assembled or disassembled.

Additionally, it will be appreciated that the present invention further provides an improved water-tight joint for removably coupling flexible pipes which is highly reliable and quickly connectable.

Finally, it will be appreciated that the present invention provides an improved water-tight joint for removably coupling flexible pipes which is not easily spoiled or clogged by soil or dirt.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A removably coupling watertight joint comprising:

a male element having a fluid passageway therethrough, at least one engaging notch, and means for providing an external watertight seal;

a female element having a mating portion for receiving the male element, means for coupling a tubular device to the female element, and a shoulder separating the mating portion from the coupling portion, said coupling portion and said mating portion forming a fluid passageway through the female element;

at least one flexible clasping tongue having an inwardly projecting tooth, said clasping tongue being integrally molded to the shoulder of said female element;

at least one opening positioned on the mating portion of the female element through which a corresponding projecting tooth of the clasping tongue may move to engage the engaging notch of the male element;

a generally cylindrical joint coupling bushing surrounding the mating portion of the female element which is longitudinally slidable in relation to said female element, said bushing having at least one internal projection which causes the elastic clasping tongue to deflect inwardly and engage the engaging notch on the male element; and means for biasing the joint coupling bushing in a lock position such that the clasping tongue is deflected inwardly in order to engage the engaging notch on the male element, said biasing means being integrally molded to the shoulder of the female element.

2. A removably coupling watertight joint comprising:

a male element having a fluid passageway therethrough, at least one engaging notch, and means for providing an external watertight seal;

a female element having a mating portion for receiving the male element, a pipe coupling portion for receiving a flexible pipe, a shoulder separating the mating portion from the pipe coupling portion, and an inner jointing tube, said jointing tube and said mating portion forming a fluid passageway through the female element, said jointing tube being configured such that a flexible pipe can be placed around said jointing tube;

at least one flexible clasping tongue having an inwardly projecting tooth, said clasping tongue being integrally molded to the shoulder of said female element;

at least one opening positioned on the mating portion of the female element through which a corresponding projecting tooth of the clasping tongue may move to engage the engaging notch of the male element;

external threads positioned on the pipe coupling portion of the female element adjacent to the shoulder of the female element;

a pipe clamping toothed crown at a distal end to the mating portion, said toothed crown having a plurality of flexible teeth extending toward the inner jointing tube;

a generally cylindrical joint coupling bushing surrounding the mating portion of the female element which is longitudinally slidable in relation to said female element, said bushing having at least one internal projection which causes the elastic clasping tongue to deflect inwardly and engage the engaging notch on the male element;

means for biasing the joint coupling bushing in a lock position such that the clasping tongue is deflected inwardly in order to engage the engaging notch on the male element, said biasing means being integrally molded to the shoulder of the female element; and an internally threaded ring capable of screwing on the external threads of the pipe coupling portion so as to push the elastic teeth of the clamping toothed crown against a flexible pipe positioned over the jointing tube, thereby securing the flexible pipe to the female element.

3. A removably coupling watertight joint as defined in claim 2, wherein the male element is a jet nozzle device comprising a nozzle body and an output adjusting bushing, said nozzle body having a tightening ring nut with a nozzle tip, which has an integrally molded cup-shaped gasket to seal the passageway between the nozzle body and the nozzle bushing.

4. A removably coupling watertight joint as defined in claim 2, wherein the mating portion of the female element has an end configured to abut against the male element, said abutting end having a plurality of inwardly projecting teeth which fit into corresponding guides in the male element said projecting teeth and said guides cooperating to prevent rotation of the male element within the female element.

5. A removably coupling watertight joint as defined in claim 2, wherein the mating portion of the female element contains a plurality of fins capable of fitting between corresponding guiding ribs located within the joint coupling bushing said fins and said guiding ribs cooperating to prevent the joint coupling bushing from rotating around the female element.

6. A removably coupling watertight joint as defined in claim 2, further comprising a comeback preventer valve having a plurality of flexible engaging feet which extend through the fluid passageway of the female element and engage an inner shoulder located between the mating portion and the jointing tube, said flexible engaging feet also engaging the male element when the male element is positioned within the female element, thereby preventing said comeback preventer valve from sealing the fluid passageway of the female element.

7. A removably coupling watertight joint as defined in claim 2, wherein the means for providing an external watertight seal is a cup-shaped gasket.

8. A removably coupling watertight joint as defined in claim 2, wherein the male element further comprises means for attaching a flexible pipe to the male element.

9. A removably coupling watertight joint as defined in claim 2, wherein the inner jointing tube is externally tapered in order to facilitate positioning of the flexible pipe around the jointing tube.

10. A removably coupling watertight joint as defined in claim 2, wherein the biasing means comprises at least one spring element configured to bias the joint coupling bushing in the lock position.

11. A removably coupling watertight joint comprising:

a male element having a fluid passageway therethrough, an engaging notch, and means for providing an external watertight seal;

a female element having a mating portion for receiving the male element, a pipe coupling portion for receiving a flexible pipe, a shoulder separating the mating portion from the pipe coupling portion, and an inner jointing tube, said jointing tube and said mating portion forming a fluid passageway through the female element;

a plurality of flexible clasping tongues each having an inwardly projecting tooth, said clasping tongues being integrally molded to the shoulder of said female element;

a plurality of openings positioned on the mating portion of the female element through which the corresponding projecting teeth of the clasping tongues may move to engage the engaging notch of the male element;

external threads positioned on the pipe coupling portion of the female element adjacent to the shoulder of the female element;

a pipe clamping toothed crown at a distal end to the mating portion, said toothed crown having a plurality of flexible teeth extending toward the inner jointing tube;

a generally cylindrical joint coupling bushing surrounding the mating portion of the female element which is longitudinally slidable in relation to said female element, said bushing having a plurality of internal projections which cause the flexible clasping tongues to deflect inwardly and engage the engaging notch on the male element;

means for biasing the joint coupling bushing in a lock position such that the clasping tongues are deflected inwardly in order to engage the engaging notch on the male element, said biasing means being integrally molded to the shoulder of the female element; and an internally threaded ring capable of screwing on the external threads of the pipe coupling portion so as to push the flexible teeth of the clamping toothed crown against the flexible pipe positioned over the jointing tube, thereby securing the flexible pipe to the female element.

12. A removably coupling watertight joint as defined in claim 11, wherein the mating portion of the female element has an end configured to abut against the male element, said abutting end having a plurality of inwardly projecting teeth which fit into corresponding guides in the male element said projecting teeth and said guides cooperating to prevent rotation of the male element within the female element.

13. A removably coupling watertight joint as defined in claim 12, wherein the mating portion of the female element contains a plurality of fins capable of fitting between corresponding guiding ribs located within the joint coupling bushing said fins and said guiding ribs cooperating to prevent the joint coupling bushing from rotating around the female element.

14. A removably coupling watertight joint as defined in claim 13, further comprising a comeback preventer valve having a plurality of flexible engaging feet which extend through the fluid passageway of the female element and engage an inner shoulder located between the mating portion and the jointing tube, siad flexible engaging feet also engaging the male element when the male element is positioned within the female element, thereby preventing said comeback preventer valve from sealing the fluid passageway of the female element.

15. A removably coupling watertight joint as defined in claim 14, wherein the male element is a jet nozzle device comprising a nozzle body and an output adjusting bushing, said nozzle body having a tightening ring nut with a nozzle tip, which has an integrally molded cup-shaped gasket to seal the passageway between the nozzle body and the nozzle bushing.

16. A removably coupling watertight joint as defined in claim 14, wherein the male element further comprises means for attaching a flexible pipe to the male element.

17. A removably coupling watertight joint comprising:

a male element having a fluid passageway therethrough, an engaging notch, and means for providing an external watertight seal;

a female element having a mating portion for receiving the male element, a pipe coupling portion for receiving a flexible pipe, a shoulder separating the mating portion from the pipe coupling portion, and an inner jointing tube, said jointing tube and said mating portion forming a fluid passageway through the female element;

a plurality of flexible clasping tongues each having an inwardly projecting tooth, said clasping tongues being integrally molded to the shoulder of said female element;

a plurality of openings positioned on the mating portion of the female element through which the corresponding projecting teeth of the clasping tongues may move to engage the engaging notch of the male element;

external threads positioned on the pipe coupling portion of the female element adjacent to the shoulder of the female element;

a pipe clamping toothed crown at a distal end to the mating portion, said toothed crown having a plurality of flexible teeth extending toward the inner jointing tube;

a generally cylindrical joint coupling bushing surrounding the mating portion of the female element which is longitudinally slidable in relation to said female element, said bushing having a plurality of internal projections which cause the flexible clasping tongues to deflect inwardly and engage the engaging notch on the male element;

means for biasing the joint coupling bushing in a lock position such that the clasping tongues are deflected inwardly in order to engage the engaging notch on the male element, said biasing means being integrally molded to the shoulder of the female element;

an internally threaded ring capable of screwing on the external threads of the pipe coupling portion so as to push the flexible teeth of the clamping toothed crown against the flexible pipe positioned over the jointing tube, thereby securing the flexible pipe to the female element;

an abutting end located on the mating portion which is configured to abut against the male element, said abutting end having a plurality of inwardly projecting teeth which fit into corresponding guides in the male element, said projecting teeth and said guides cooperating to prevent the male element from rotating within the female element;

a plurality of fins integrally molded to the shoulder of the female element capable of fitting between a plurality of internal guiding ribs located within the joint coupling bushing, said fins and said guiding ribs cooperating to prevent the joint coupling bushing from rotating around the female element; and a comeback preventer valve having a plurality of flexible engaging feet which extend through the fluid passageway of the female element and engage an inner shoulder located between the mating portion and the jointing tube of the female element, said flexible engaging feet also engaging the male element when the male element is positioned within the mating portion of the female element, thereby allowing fluid to flow around said come-back preventer valve and through the fluid passageway of the female element.

18. A joint for removably coupling flexible pipes as defined in claim 17, wherein the male element is a jet nozzle device comprising a nozzle body and an output adjusting bushing, said nozzle body having a tightening ring with a nozzle tip which has an integrally molded cup-shaped gasket to seal the passageway between the nozzle body and the nozzle bushing.

* * * * *

UNITED STATES PATENT AND TRADEMARK OFFICE
CERTIFICATE OF CORRECTION

PATENT NO. : 4,796,856

DATED : January 10, 1989

INVENTOR(S) : Dino Munini

It is certified that error appears in the above-identified patent and that said Letters Patent is hereby corrected as shown below:

Abstract, lines 1-2, "removably coupling watertight joint" should be --removable coupling watertight joint--
Column 1, line 66, "structures complicates" should be --structures complicate--
Column 1, line 67, "makes" should be --make--
Column 1, line 67, "reduces" should be --reduce--
Column 2, line 35, "at relatively low cost" should be --at a relatively low cost--
Column 2, line 68, "In its lock position" should be --In its locked position--
Column 3, lines 15-16, "at very low cost" should be --at a very low cost--
Column 3, line 51, "referring" should be --Referring--
Column 5, line 66, "comeback preventer valve" should be --comeback preventer valve 20--
Column 9, line 51, "bushing said" should be --bushing, said--

Signed and Sealed this

Seventh Day of November, 1989

Attest:

JEFFREY M. SAMUELS

*Attesting Officer*  *Acting Commissioner of Patents and Trademarks*